Aug. 3, 1954  E. RONDTHALER  2,685,410
TABULAR CALCULATOR
Filed Feb. 4, 1950

INVENTOR.
EDWARD RONDTHALER
BY
S. B. Schlessel

Patented Aug. 3, 1954

2,685,410

UNITED STATES PATENT OFFICE 2,685,410

TABULAR CALCULATOR

Edward Rondthaler, Croton-on-Hudson, N. Y.

Application February 4, 1950, Serial No. 142,470

8 Claims. (Cl. 235—89)

The subject matter of this invention relates to a new form of graph structure composed of several dependent members, upon which assets and liabilities, or income and expenditures can be accurately charted, to govern and control the expenditure of funds within prescribed limits.

This invention relates to calculators and graph charts, and comprises a chart member upon which successive arithmetical computations can be indicated by means of a calculator member, and from which the results of such successive computations can be readily ascertained by means of a totaling member, for the purpose of providing a visual budget record.

The primary object of the invention is to provide a graph structure upon which can be charted the chronological expenditure of funds which have been allocated for a specific purpose, so that immediate visual knowledge is always available to determine the extent of spending and to serve as a warning signal when the allocated funds are close to being exhausted.

A second object is to provide a graph structure with a quick, simple and effective method of calculating expenditures and determining reserves without the usual mathematical calculations heretofore necessary, and which will provide at a glance full knowledge of the user's financial position.

A third object of my invention is to provide an inexpensive and permanent record of various kinds of expenditures over specific periods, for purposes of comparison with other periods of time.

Another important object is to provide a budget structure which will enable the user to keep within his or her budget, and at the same time afford proper allowances for all necessary purchases and expenditures.

Other salient objects, advantages and functional features will be more readily appreciated from the detailed specification, taken with the accompanying drawings wherein.

Similar reference characters designate similar parts throughout the different views.

Figure 1:
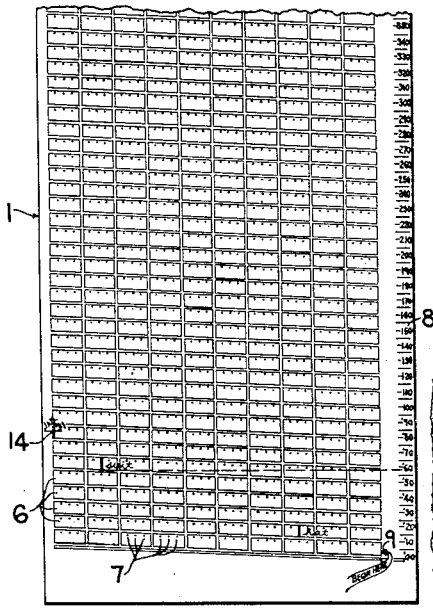
Fig. 1 is a front view of a graph chart, made according to my invention.
Figure 2:
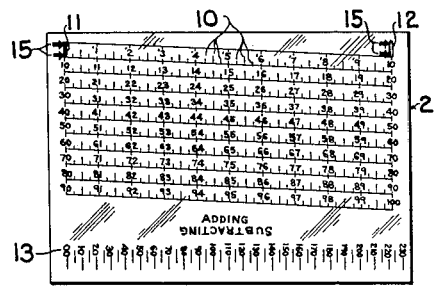
Fig. 2 is a front view of transparent calculating member used in connection with the chart.

Illustrative of the embodiment shown and described by Figs. 1 and 2, my invention consists of a graph chart member 1 divided into horizontally angled lines of parallelograms 6, there being ten parallelograms in each of said lines, each parallelogram being ½ inch long in the embodiment, and each parallelogram representing the unit value of $1.00. These parallelograms, which will hereinafter be termed "units" for brevity, are divided into quarters by the dots 7 along their upper surfaces. The units 6 are arranged in an angled manner so that the lower left corner of the last unit on the left side of each line is on an exact horizontal plane with the lower right corner of the first unit on the right side of the line of units immediately above. The gradual upward incline of the units is such that if the graph chart were rolled into the form of a cylinder, with a circumference of ten units, a continuation of the bottom sides of these units would form a continual, uniformly ascending helix.

The number of lines of units 6 may vary in use of the invention, depending upon the amount of money that is allocated for the specific budget item, so that, with each line of units 6 representing $10.00, each ten lines represent $100.00, etc. For normal use a chart of 100 lines of units is recommended, although a continuous chart of several hundred lines of units is practical for use.

Upon the right margin of the graph chart 1 is provided a graduated scale 8, from which there can be determined the number of expense units 6 that have been exhausted, viz.; on a horizontal plane with the lower left corner of the unit which is last on the left side of each line there is marked off upon the scale 8 the total value of all of the lines of units up to that point, such as "10" at the end of the lowest line of units 6, "20" at the end of the second line, etc. Further division, upon the scale 8, of the value of each line of units into halves is likewise designated on the scale 8.

The graph chart 1 has an indicator 9 showing where the original calculation is to begin, and space is provided either at the top or bottom of the graph chart to designate the item to be budgeted thereon, and other useful information in connection with the same, as will hereafter appear.

Used in conjunction with the graph chart 1 is a calculator 2, as shown by the embodiment in Fig. 2, which is composed of a transparent, firm material. A cellulose composition or other similar composition known in the art may be used.

Upon the calculator 2 is inked or etched a table from 1 to 100, the space between each numeral representing the length of a unit of identical size with those of graph chart 1, the lines thereof angled to come in registry with the angled lines of the units 6 in graph chart 1.

Each of the numerals of the calculator 2 is subdivided into quarters, the subdivision marks 10 adapted to come in registry with the subdivisional dots 7 of the units 6 on the graph chart, and provided to mark off equal quarters of such numerals. Integral with the "0" mark on the calculator 2 is cut a slotted opening 11 through which budget markings are to be made as will hereafter appear and be described, and parallel to said slot 11, but at the other end of the calculator 2 and immediately above the numeral "10" is cut an identical slot 12, both slots 11 and 12 having indicator arrows. The calculator 2 is further marked to be held in the position shown by Fig. 2 for purposes of addition, and to be inverted for purposes of subtraction. At the base of the calculator 2 there is provided a graduated scale 13, identical with the scale 8 on the graph chart 1.

Scale 13 may be used to determine any designated total on the graph chart 1 by applying the calculator 2 upon the graph chart 1 so that the "0" marks of scales 8 and 13 are horizontally aligned, with the scale 13 directly over the designated pencil mark on the graph chart 1. The base of the pencil mark will be directly under the mark on the scale 13 indicating the total computation.

Figure 3:
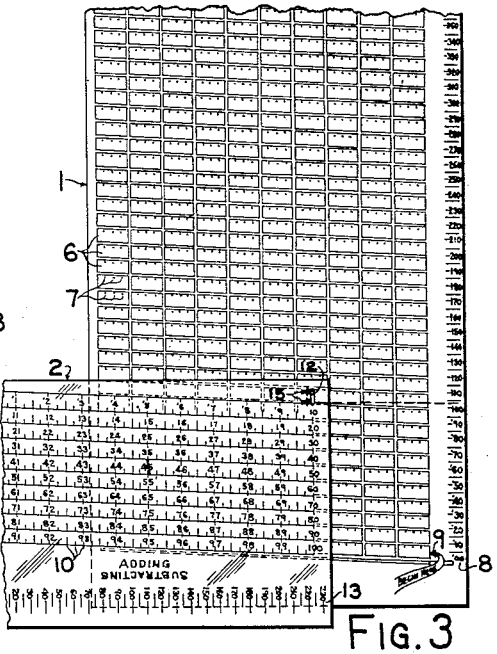
Fig. 3 shows superposition of calculating member upon the graph chart, in position for registration of an expense item.

In operation, the calculator 2 is superposed on the graph chart 1 in the position as shown by Fig. 3, so that the angled lines of the calculator 2 come in registry with the bottom sides of the units 6. For example, assume that the graph chart 1, used in Figs. 1 and 3, is to be used to budget clothes for the year, and that the sum of $80.00 is allocated for the month of January. A stop mark 14 is placed by pencil or similar means upon the chart 1, showing the amount and the period of time it is to cover. The sum of $12.50 is used for the purchase of a hat, and the sum of $46.00 is used for the purchase of a suit within said month. To mark the purchase of $12.50 the calculator is placed upon the graph chart 1 so that the angled lines of both are in registry and the midway mark between "12" and "13" of the calculator is in registry with the right side of the first unit 6 on the right side of the bottom line of the graph chart 1, where indicated by the "begin here" arrow 9. A pencil line is made through slot 11 of the calculator 2 onto the graph chart 1, and the word "hat" is thereafter written next to such line, as indicated. To mark the purchase of a suit for $46.00 the calculator 2 is then placed upon the graph chart 1 so that the angled lines of both are in registry, and the line indicating "46" on the calculator 2 is aligned with the previously made pencil mark denoting the purchase of the hat. A pencil line is then made through slot 11 of the calculator 2 onto the graph chart 1, and the word "suit" is then written next to this mark, as indicated. The number of units 6 remaining between the mark indicating the purchase of the suit, and the stop mark 14, shows the amount of money remaining unspent for the month. This can be determined quickly, by inverting the calculator 2, as previously described, and aligning the lines thereof with the units 6 of the graph chart so that the slot 11 is in registry with the mark indicating the purchase of the suit. The stop mark 14 will become aligned with the mark on the calculator 2 which is midway between the numerals "21" and "22," indicating that the sum of $21.50 remains unspent. Another method of determining the amount spent is to carry the bottom point of the last mark, on a horizontal plane, over to the scale 8 on the side of the graph chart 1, as indicated in Fig. 1. This will indicate that slightly under $60.00 has been spent up to that point.

In use, when the calculator 2 is superposed upon the graph chart 1, only one of the two slots 11 and 12 will lie upon the graph chart. The correct addition or subtraction will be noted through such slot. Thus, in Fig. 3, where the sum of $45.00 is added to a previous total of $58.50, the calculator is placed upon the graph chart 1 in position as described, with the "45" mark on the calculator in registry with the previously made pencil mark on the graph chart which denoted the total of $58.50. A pencil mark made through slot 12 of the calculator onto the graph chart will indicate a total of $103.50, or "103½" upon the graph chart 1.

Figure 5:
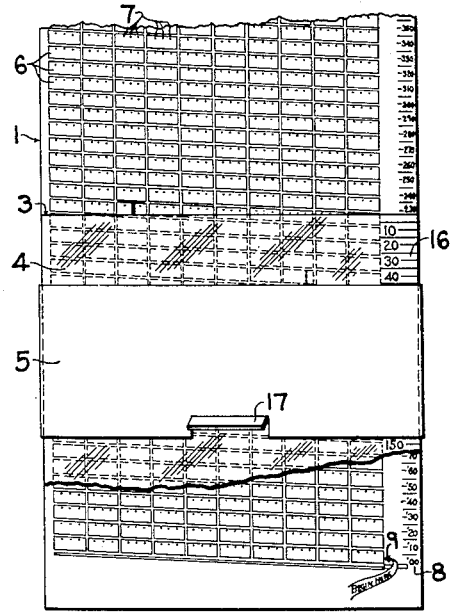
Fig. 5 is a view of the graph chart, with the totaling member superposed, in position for making a reading of specific expenditures.
Figure 4:
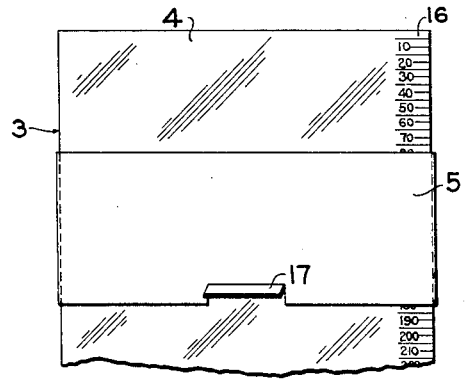
Fig. 4 is a front view of transparent totaling member.

Used in conjunction with the graph chart 1 and the calculator 2, as part of my invention, is a totaler 3, shown by the embodiment in Fig. 4. This consists of a transparent cellophane portion 4, of the same size as the graph chart 1, and having marked or etched along its right hand margin a graduated scale 16, which has identical measuring marks as the scales 8 and 13, but constructed to read downward instead of upwards. Slideably mounted on the cellophane portion 4 is a collar portion 5, made of an opaque material, and moveable on said cellophane portion 4 by means of a finger piece 17. The totaler 3 is used to determine the amount spent for any particular item, for any particular period of time, to determine remaining available expenditures and to total the amounts of separate budget charts. It is used, as illustrated in Fig. 5, by placing the totaler 3 in horizontal alignment upon the graph chart 1 so that the upper "zero" edge of the cellophane portion 4, which is in a precise horizontal plane, touches the bottom point of the mark indicating the expenditure to be measured. The collar portion 5 is then moved downward from the top, by means of the finger piece 17, until the upper edge of the collar portion 5 registers with the lowest point of the previous expenditure mark. The reading on the graduated scale 16 shows that the amount of expenditure measured is on the midway mark between "40" and "50," indicating that the expenditure total is "45," or $45.00. The same procedure can be used to determine the balance remaining unspent, between the stop mark 14 and the expenditure for the suit, as shown in Fig. 1.

Assuming that a different graph chart is used for each item of a budget, such as food, clothing, rent, utilities, etc., and that the balance of money at hand for the month must be determined, to date, the totaler 3 is used upon the first graph chart as indicated above, and the amount between the last expenditure mark and the total allocation mark is measured. Keeping the collar portion 5 of the totaler 3 so fixed, the totaler 3 is applied to the next graph chart so that the upper edge of the collar portion 5 touches the bottom of the allocation mark for this chart. The collar portion 5 is then moved downward along the cellophane portion 4, until the upper edge of the collar portion 5 comes in registry with the lowest point of the last expenditure mark on this chart. The graduated scale 16 automatically adds this amount to the total previously indicated. This is continued with all of the graph charts in use, and the final sum total as shown upon the graduated scale 16, after the completed operation, indicates the total amount of allocated funds which remain on hand available for use.

It is to be specifically noted that my invention requires the use of a graph chart 1, calculator 2 and totaler 3 for complete operation as indicated, and for the purposes for which it is intended. Obviously, the graph chart 1 and the calculator 2 may be used without the need of the totaling member 3, so far as indicating of expenditures is concerned. However, in order to calculate the amount of each expenditure, to total expenditures of several charts, and to determine the balance of available funds, the totaler 3 must be used.

It is further to be specifically noted that all three members of my invention are interdependent.

Since the objective of my invention is the measurement of units laid out in the form of a uniformly ascending slant, by means of a scale graduated to such an ascent, it is obvious that there may be a substitution or change in the positioning of the ascending plane, to accomplish the same results, and such substitution or change in positioning is clearly within the spirit and scope of my invention.

It is manifestly apparent that my invention is superior to and has many distinct advantages over any present method of computing and calculating expenditures and allocations. It eliminates the necessity for any substantial knowledge of bookkeeping or mathematics, and provides a simple and economical method for keeping a budget record of income and expenses, providing an instant, visual panorama of what the money is spent for. In this way it is simple for the user to correct an unbalanced budget with a minimum of difficulty.

The embodiment shown in the drawings is by way of illustration, and various changes may be made in the construction and arrangement of parts without limitation upon or departure from the spirit and scope of the invention, or sacrificing any of the advantages thereof inherent therein, and the embodiments shown are not intended as a limitation of the scope of the invention as described.

Having described my invention, what I claim is:

1. In a device of the class described the combination of a graph chart having parallel rows of identical units rising obliquely from the bottom of the graph chart with a transparent calculator having a numerical scale, with the numbers spaced apart the length of one unit, arranged in parallel lines rising obliquely and adapted, when superposed, to come in registry with the lines of the units on the graph chart, the calculator provided with slots through which successive specified readings on the calculator may be marked upon the graph chart.

2. In a device of the class described the combination of a graph chart having parallel rows of identical units rising obliquely from the bottom of the graph chart, and a transparent totaler adapted to be superposed directly upon the graph chart with means for measuring any specified number of units previously successively indicated upon the graph chart.

3. In a device of the class described the combination of a graph chart having rows of identical units rising obliquely from the bottom of the graph chart, each of said rows being equal in length and having the same number of units of equal and uniform size and shape, said rows being arranged on successive parallel lines in a sequence and a transparent totaler adapted to be superposed directly upon the graph chart with means for measuring any specifier number of units successively indicated upon the graph chart.

4. In a device of the class described the combination of a graph chart having rows of identical units rising obliquely from the bottom of the graph chart, each of said rows being equal in length and having the same number of units of equal and uniform size and shape, said rows being arranged on successive parallel lines in a sequence, and a transparent totaler adapted to be superposed directly upon the graph chart, said totaler comprising a base and an opaque collar slideably mounted thereon, a finger piece upon the collar to move the collar vertically along the base, and a graduated scale vertically arranged on the totaler base, said totaler being adapted to be superposed upon the graph chart to measure the number of units successively marked upon the graph chart in registry therewith.

5. In a device of the class described, the combination of a graph chart and a transparent calculator, the graph chart provided with a plurality of rows of units having uniform size and shape, each of said rows containing an equal number of units and being uniform in length, said rows being arranged on successive parallel lines in a sequence, rising obliquely from the bottom of the graph chart, the transparent calculator provided with a numerical scale arranged on succeeding parallel lines equal in length to the rows of the graph chart, the numbers of the scale spaced apart the length of a single unit of the graph chart, said lines of the scale rising obliquely and adapted, when superposed, to come in registry with the bottoms of the rows of units on the graph chart, the calculator further provided with a slot along the zero mark of the numerical scale and a similar slot disposed in horizontal alignment therewith at the oppoiste side of the numerical scale to permit specified readings on the scale to be marked successively upon the units of the graph chart through the slot in registry therewith.

6. In a device of the class described, the combination of a graph chart and a transparent calculator, the graph chart provided with a plurality of identical parallelograms arranged in rows of uniform number, said rows arranged on successive parallel lines in a sequence rising obliquely from the bottom of the graph chart, the transparent calculator provided with a numerical scale arranged on successive parallel lines equal in length to the rows of the graph chart, with the numbers thereof spaced apart the length of one parallelogram, said lines rising obliquely and adapted, when superposed, to come in registry with the bases of the parallelograms on the graph chart, the calculator being further provided with a slot along the zero mark of the numerical scale and a similar slot disposed in horizontal alignment therewith at the opposite side of the scale to permit specified readings on the scale to be marked successively upon the parallelograms of the graph chart through the slot in registry therewith.

7. The device, according to claim 6, the parallelograms of the graph chart and the numbers of the scale upon the calculator being divided into quarters, as shown.

8. The device, according to claim 6, the graph chart being further provided with a vertical scale at the side thereof, the scale being adapted to measure the number of parallelograms and fractions thereof on the graph chart on a horizontal plane and being graduated according to the degree of ascent.

References Cited in the file of this patent

UNITED STATES PATENTS

| Number | Name | Date |
|---|---|---|
| 206,136 | Roche | July 16, 1878 |
| 679,261 | Johnson | July 23, 1901 |
| 712,964 | Quimby | Nov. 4, 1902 |
| 860,662 | Herbert | July 23, 1907 |
| 1,040,592 | Thomas | Oct. 8, 1912 |
| 1,088,889 | Falvey | Mar. 3, 1914 |
| 1,443,855 | Swaim | Jan. 30, 1923 |
| 1,526,472 | Gardner | Feb. 17, 1925 |
| 1,598,600 | Butterfield | Sept. 7, 1926 |
| 1,600,676 | Kienbaum | Sept. 21, 1926 |
| 2,265,372 | Johnson et al. | Dec. 9, 1941 |

FOREIGN PATENTS

| Number | Country | Date |
|---|---|---|
| 2,516 | Great Britain | Feb. 5, 1901 |
| 40,224 | Norway | Nov. 10, 1924 |
| 571,147 | France | Jan. 28, 1924 |
| 736,674 | France | Sept. 26, 1932 |